(12) United States Patent
Marini et al.

(10) Patent No.: US 8,882,194 B2
(45) Date of Patent: Nov. 11, 2014

(54) AIRCRAFT SEAT ENERGY ABSORBING DEVICE FOR OCCUPANT RESTRAINT

(71) Applicant: PAC Seating Systems, Inc., Palm City, FL (US)

(72) Inventors: Hector Noel Marini, Palm City, FL (US); Kevin James Read, Palm City, FL (US); Oriol Oliva-Perez, Palm City, FL (US); Jad Azzi, Palm City, FL (US)

(73) Assignee: PAC Seating Systems, Inc., Palm City, FL (US)

( * ) Notice: Subject to any disclaimer, the term of this patent is extended or adjusted under 35 U.S.C. 154(b) by 45 days.

(21) Appl. No.: 13/775,466

(22) Filed: Feb. 25, 2013

(65) Prior Publication Data

US 2014/0239683 A1   Aug. 28, 2014

(51) Int. Cl.
*B60N 2/42* (2006.01)
*B60N 2/427* (2006.01)
*B64D 11/06* (2006.01)

(52) U.S. Cl.
CPC .................... *B64D 11/06* (2013.01)
USPC ................................ 297/216.13

(58) Field of Classification Search
CPC ...... B60N 2/686; B60R 22/024; B60R 22/26; B60R 2022/021
USPC ............. 297/216.1, 216.13, 216.14, 216.15, 297/216.16, 216.2
See application file for complete search history.

(56) References Cited

U.S. PATENT DOCUMENTS

| 4,249,769 | A | * | 2/1981 | Barecki ................ 297/216.13 X |
| 4,718,719 | A | | 1/1988 | Brennan |
| 4,911,381 | A | | 3/1990 | Cannon et al. |
| 5,152,578 | A | | 10/1992 | Kiguchi |
| 5,224,755 | A | | 7/1993 | Beroth |
| 5,681,091 | A | | 10/1997 | Larson et al. |
| 5,788,185 | A | * | 8/1998 | Hooper ................ 297/216.13 X |
| 7,080,881 | B2 | | 7/2006 | Williamson et al. |
| 7,789,460 | B2 | * | 9/2010 | Lamparter et al. ....... 297/216.13 |
| 7,896,434 | B2 | * | 3/2011 | Lamparter et al. ....... 297/216.13 |
| 8,118,361 | B2 | * | 2/2012 | Lamparter et al. ....... 297/216.13 |
| 8,123,293 | B2 | * | 2/2012 | Marriott et al. .......... 297/216.13 |
| 2008/0211275 | A1 | * | 9/2008 | Lamparter et al. ....... 297/216.13 |
| 2010/0148547 | A1 | * | 6/2010 | Marriott et al. .......... 297/216.13 |
| 2011/0140488 | A1 | * | 6/2011 | Marriott et al. .......... 297/216.13 |
| 2011/0148158 | A1 | * | 6/2011 | Lamparter et al. ....... 297/216.13 |
| 2012/0217775 | A1 | * | 8/2012 | Fujita et al. .............. 297/216.13 |

* cited by examiner

*Primary Examiner* — Rodney B White
(74) *Attorney, Agent, or Firm* — Troutman Sanders LLP

(57) ABSTRACT

An energy absorbing device for a seat containing an occupant includes a seat frame with legs, a seat pan, and a back member. Attached to the seat is an energy absorbing device fixed to the back member of the seat frame. The energy absorbing device includes an engagement portion fixing the energy absorbing device to the seat frame and an energy absorbing extension having a fixed end integral with the engagement portion, and a protruding end extending toward the seat pan. The seat has a seat belt for the occupant and the belt is attached to a belt support device which extends parallel to the energy absorbing extension. When the occupant is using the seatbelt and the seat undergoes lateral forces, the energy absorbing extension undergoes deformation, and when the occupant is not using the seatbelt and the seat undergoes lateral forces, the energy absorbing extension does not undergo deformation.

12 Claims, 6 Drawing Sheets

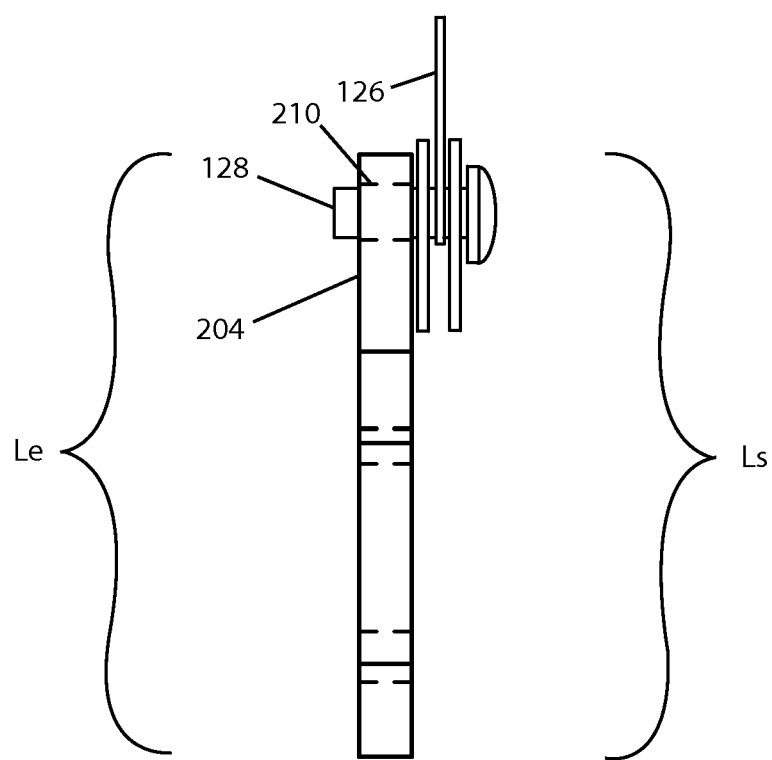

AIRCRAFT SEAT ENERGY ABSORBING DEVICE FOR OCCUPANT RESTRAINT

FIELD OF THE INVENTION

This invention relates to an aircraft passenger seat and a passenger seat seatbelt assembly which includes an energy-absorbing zone for providing controlled bending of the seatbelt assembly under the stress of a sideways motion or impact.

BACKGROUND

In order for aircraft seating to be certified for use in an aircraft, the seat must pass a series of performance tests to ensure that it will withstand the various dynamic forces that it may be subjected to, particularly in an emergency situation. In order to be certified as airworthy, aircraft seating designs must pass a series of dynamic tests that simulate aircraft deformation and impulse loading during emergency conditions.

Also, weight is a very significant factor in designing any structure for an aircraft. Weight relates directly to fuel consumption. For this reason every effort is made to design structures to be used in aircraft to be as light as possible consistent with other requirements. One of these other requirements is passenger safety. A seat could be built heavily and sturdily enough not be bend or break during an aircraft accident merely by fabricating it of heavy steel or of thick, solid aluminum. However, the weight penalty is so great that the use of such structures is economically impractical.

Thus, aircraft seating must be strong enough to not only support the weight of the seat occupant, but also to withstand the various load forces that are generated as a result of aircraft maneuvers performed by the pilot during flight, upon landing or, more importantly, in the event of an emergency. These various load forces are known as "g-forces" and result from the forces of acceleration that push or pull on the seat and its occupant when the pilot changes the motion of the aircraft.

G-forces can be positive or negative and can result from either an acceleration or deceleration of the aircraft. In addition to acceleration loads encountered in flight, g-loads are also experienced during periods of rapid acceleration or deceleration such as occurs during the takeoff and landing phase of a flight. These g-forces exert a rearward force with respect to the aircraft during periods of acceleration, thereby forcing one back into the seat on takeoff, and a forward force during the period of deceleration on landing, thereby pulling one forward in the seat. Further, lateral g-forces can be experienced when the aircraft turns, forcing the occupant sideways across the seat if the aircraft seat is set sideways (such as a divan), as can be in a business jet.

During a normal take-off, landing, and maneuvers, a passenger absorbs this g-loading by shifting in the seat; forward, backwards, and into the seatbelt. In the event of an emergency or crash landing, however, the seat frame itself must be capable of absorbing high g-loads without being deformed or, even worse, snapped out of the floor of the aircraft. This is particularly true of a sideways facing seat.

Conventional seats that supply the structure necessary to withstand the emergency g-forces from the aircraft are also very heavy. Presently ways to absorb the g-forces required by Federal Aviation Administration ("FAA") regulations and produce a lighter seat, are difficult, with the seat still being heavy. Thus, there is a need for a lighter weight aircraft seats that can absorb the same load.

SUMMARY

An energy absorbing device for a seat containing an occupant can include a seat frame having an upper surface and a lower surface, legs attached to the lower surface of the seat frame, a seat pan attached to the upper surface of the seat frame, and a back member attached to the upper surface of the seat frame and approximately perpendicular to the seat pan. Attached to the seat can be an energy absorbing device fixed approximate to where the back member attaches to the seat frame. The energy absorbing device can include an engagement portion fixing the energy absorbing device to at least one of the seat frame and the back member and an energy absorbing extension having a fixed end integral with the engagement portion, and a protruding end extending toward the seat pan. The seat also has a seat belt for the occupant and the seat belt is attached to a belt support device. The belt support device has a first end fixed to the engagement portion, and a second end, approximately opposite the first end, engaging a seatbelt to support the occupant, and extends parallel to the energy absorbing extension. Thus, when the occupant is using the seatbelt and the seat undergoes lateral forces, the energy absorbing extension undergoes deformation, and when the occupant is not using the seatbelt and the seat undergoes lateral forces, the energy absorbing extension does not undergo deformation.

The energy absorbing device is for an aircraft seat. Also, the energy absorbing extension is unsupported by any of the seat frame, seat pan, or back member between the fixed end and the protruding end. Further, the energy absorbing extension can extend at an angle of about 30°-60° from engagement portion, or can be at an angle of about 45° from engagement portion.

Furthermore, the energy absorbing extension of the energy absorbing device can undergo deformation at about 10 gravities. That deformation can be plastic deformation. The energy absorbing extension can also undergo deformation at about 16 gravities and that deformation can be plastic deformation. The energy absorbing extension can undergo deformation from about 2 gravities to about 10 gravities and that can be elastic deformation and past 10 gravities, plastic deformation. With the energy absorbing device, the seat can withstand the loading of the occupant undergoing a deceleration of a minimum of 44 feet per second to 0 feet per second in less than or equal to 0.09 seconds with a peak deceleration of at least 16 gravities.

BRIEF DESCRIPTION OF THE DRAWINGS

FIG. 6 is a cross-section of the engagement between the energy absorbing device and the seatbelt support device.

DETAILED DESCRIPTION

Exemplary embodiments are described hereinafter with reference to the accompanying drawings, in which exemplary embodiments and examples are shown. Like numbers refer to like elements throughout.

Figure 1:
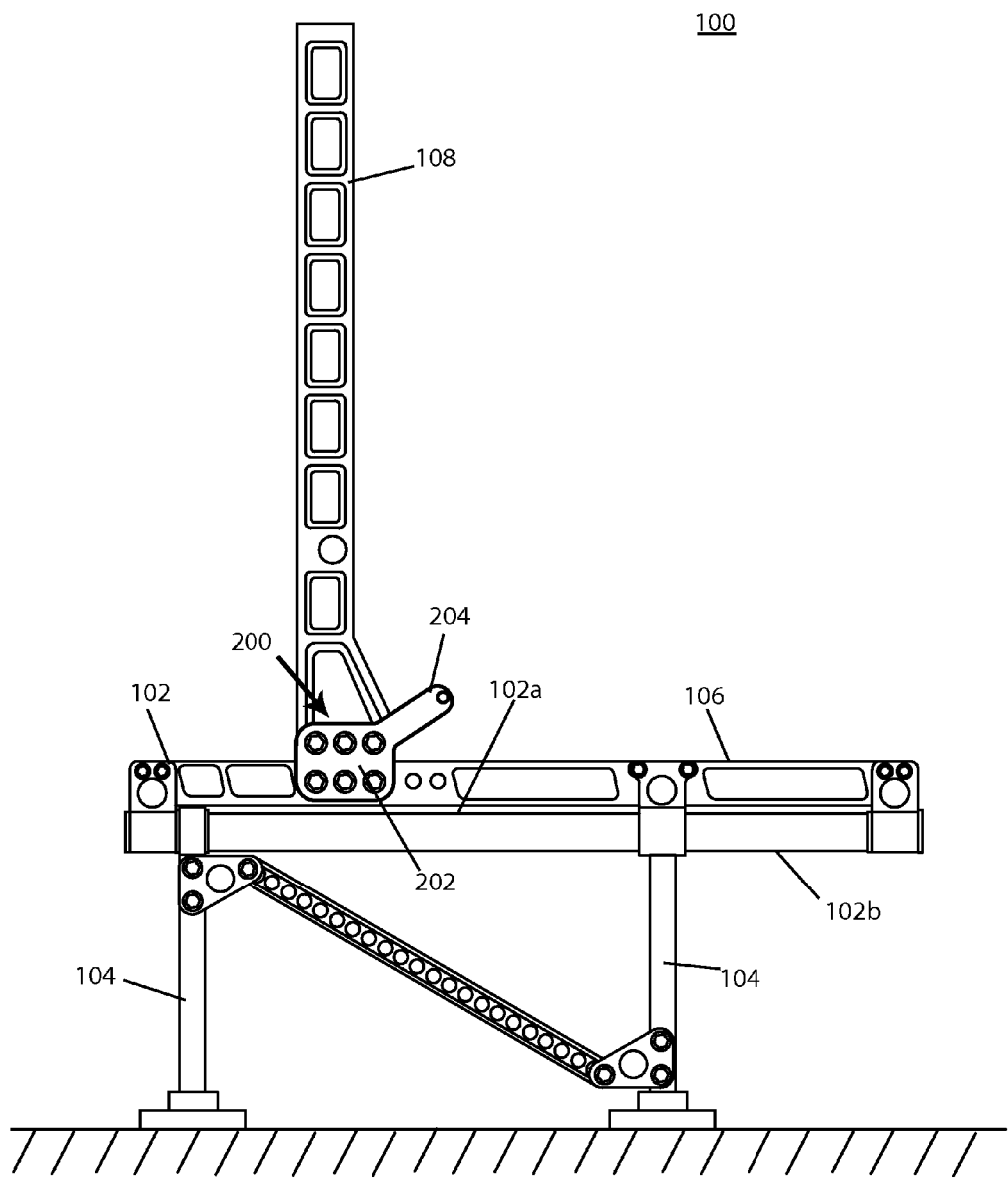
FIG. 1 is a side view of a seat frame.
Figure 2:
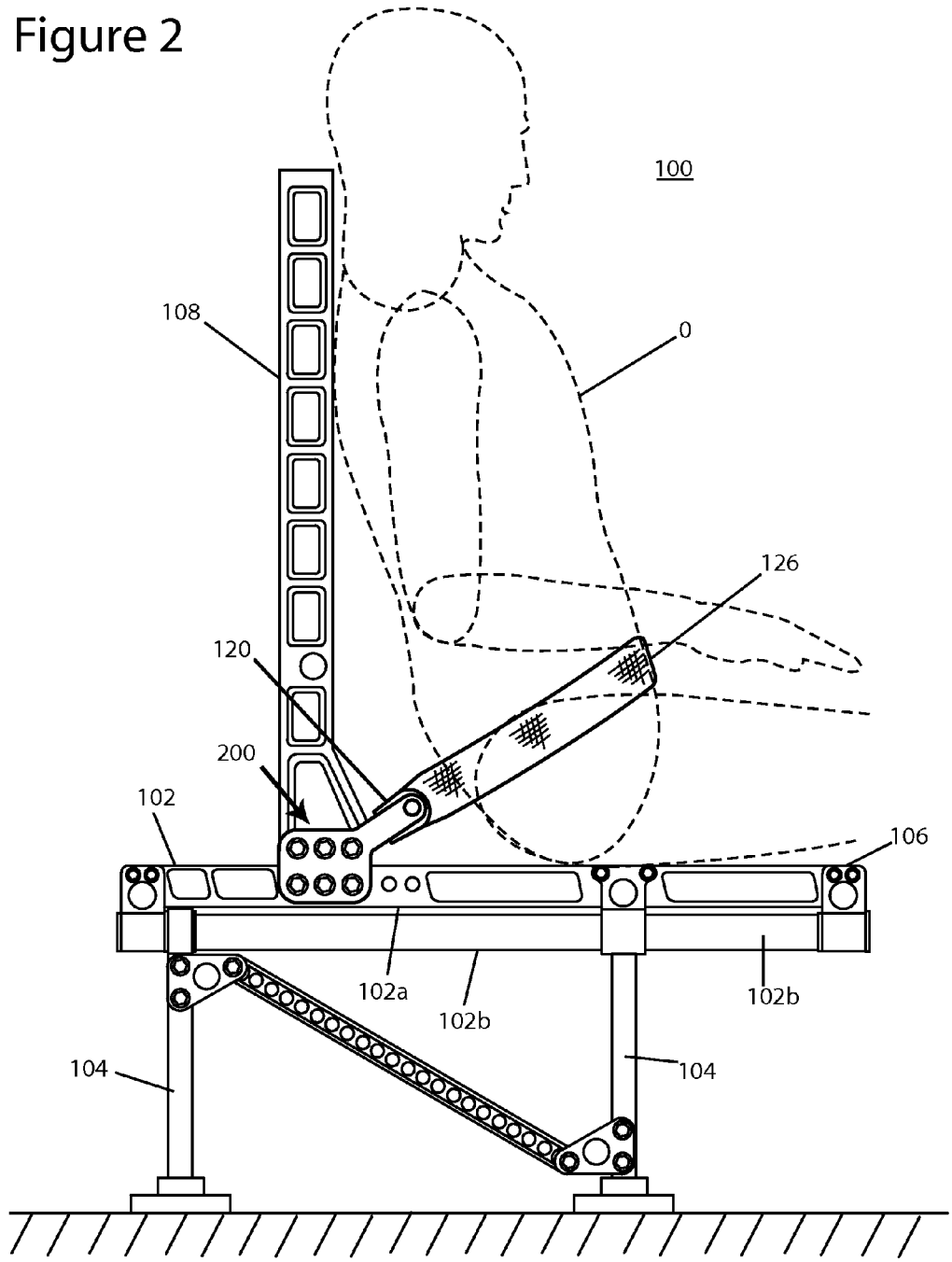
FIG. 2 is the side view of the seat frame with an occupant.
Figure 3:
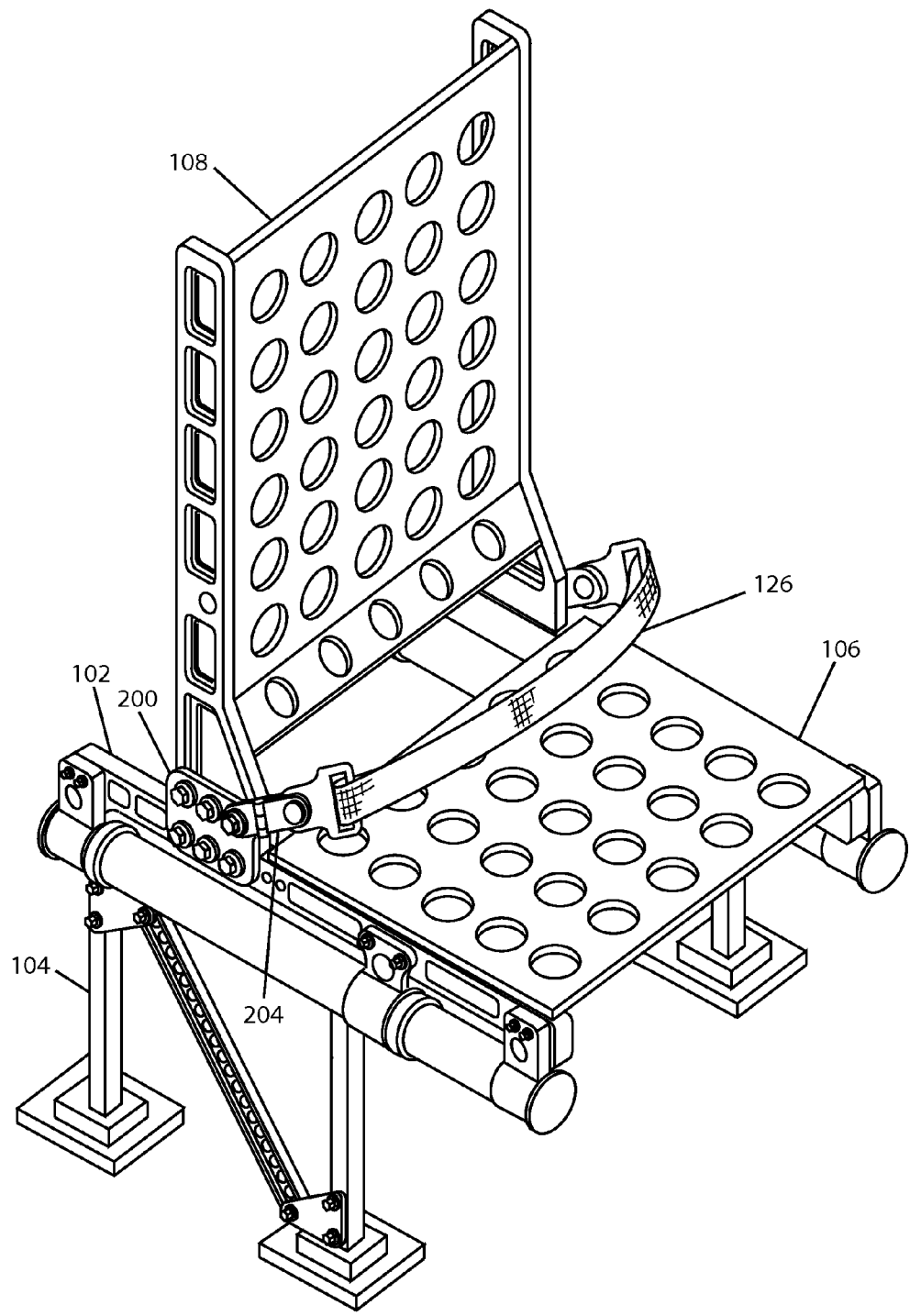
FIG. 3 is a front side profile view of the seat frame.
Figure 4:
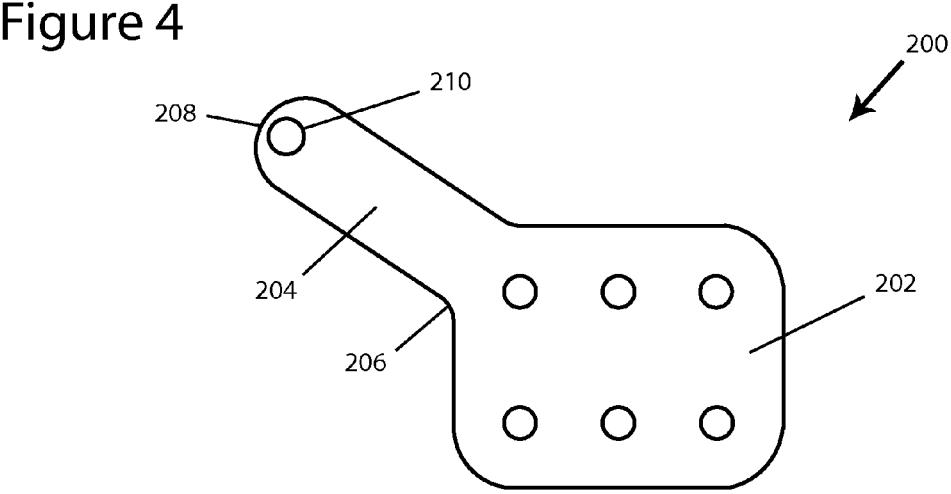
FIG. 4 is a side view of the energy absorbing device of an example of the present invention.
Figure 5A:
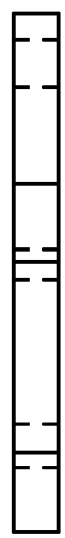
FIGS. 5A-5C are front views of the energy absorbing device pre-extreme loading, post extreme loading, and engaged with the seatbelt support device.
Figure 5B:
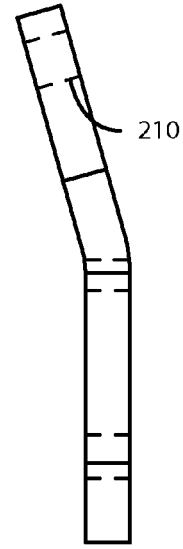
Figure 5C:
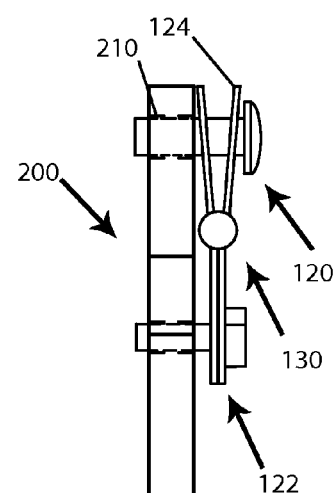

FIGS. 1-3 illustrate an aircraft seat 100 having a seat frame 102. FIG. 2 illustrates an occupant O in the seat 100. The seat frame 102 typically has an upper surface 102*a* and a lower surface 102*b*. These surfaces 102*a*, 102*b* correspond to a top and bottom of the seat frame 102 and may be solid or the frame of the members making up the seat. Attached to the lower surface 102*b* of the seat frame 102 can be one or more leg members 104. The leg members 104 can take any shape or configuration to be used to secure the aircraft seat 100 to the aircraft. A single leg member 104 can have one or more points of contact with the lower surface 102*b* and the aircraft.

Attached to the upper surface 102*a* of the seat frame 102 can be a seat pan 106. The seat pan 106 forms part of the support for the legs, hips, and buttocks of the occupant O. The seat pan 106 can further support a cushion member (not illustrated) or itself be padded to provide comfort to the occupant O. Further support for the occupant O can come from a back member 108 attached to the upper surface 102*a* of the seat frame 102. The back member 108 can be attached approximately perpendicular to the seat pan 106 to support the occupant's O back and shoulders. As is well known, the seatback 108 can recline from approximately perpendicular to a wide variety of ranges from a few degrees to approximately parallel to the seat pan 106. As is also known, the seat pan 106 may shift to accommodate the reclining of the back member 108.

Additionally, an energy absorbing device 200 can be fixed to the seat frame 102 approximate to where the back member 108 attaches to the seat frame 102. The position of the energy absorbing device 200 is such that it stays relative to the hips of the occupant O. The energy absorbing device 200 is illustrated in detail in FIGS. 4 and 5A-5C. The energy absorbing device 200 can include an engagement portion 202 which can fix the energy absorbing device 200 to at least one of the seat frame 102 and/or the back member 108. Fixing the energy absorbing device 200 can include any method known in the art, including multiple bolts (see, FIG. 1) through both the engagement portion 202 and the seat frame 102. The fixing method should comply with FAA regulations. Note that, in one example, there are two energy absorbing devices 200 each one mounted on opposite sides of the seat 100.

The energy absorbing device 200 further includes an energy absorbing extension 204 having a fixed end 206 and a protruding end 208. The fixed end 206 can be, in an example, integral with the engagement portion 202 and the protruding end 208 can extend outward away from the back member 108 and the seat pan 106. The energy absorbing extension 204 can extend from the engagement portion 202 at a range of angles, in one example from about 30°-60° from the horizontal. In another example, the energy absorbing extension 204 can extend out at about 45°.

Also attached to the aircraft seat 100 is a seat belt support device 120. The seat belt support device 120 has a first end 122 and a second end 124 approximately opposite the first end 122. The first end 122 of the support device 120 can be fixed to the engagement portion 202 of the energy absorbing device 200. In one example, this fixation is by at least one bolt through the seat belt support device 120, the engagement portion 202 and the seat frame 102. Other techniques can be used to assemble the two elements, as long as they are FAA approved methods.

The second end 124 of the seat belt support device 120 can engage a seatbelt 126 which can restrain the occupant O. The seatbelt support device 120 and the seatbelt 126 can be engaged as known in the prior art. In another example, the protruding end 208 of the energy absorbing extension 204 can have a hole 210 therethrough. The hole 210 can align with the portion of the seat belt support device 120 that engages the seatbelt 126. FIG. 6 illustrates that seat belt bolt 128 passes through the seatbelt support device 120 and partially resides in the hole 210. This allows the belt support device 120 to be located closer to the protruding end 208 by allowing the element 128 engaging the seatbelt 126 to fall within the hole 210. In one example, the support device 120 and the protruding end 208 of the energy absorbing extension 204 are not engaged to each other using the hole 210, the hole 210 (or recess) just accepts the element 128 connecting the seatbelt 126 to the support device 120 without engaging it.

The support device 120, in one example, is hinged 130, to allow the support device 120 to move toward and away from the energy absorbing extension 204. In one example, at the closest contact between the protruding end 208 of the energy absorbing extension 204 and the support device 120, they contact along almost their entire lengths Le, Ls. When the two 120, 204 are in contact, the elements extend almost parallel to each other.

In an example, under normal use by the occupant O, the support device 120 can swing back and forth into contact with the energy absorbing extension 204 as the occupant O uses the seatbelt. When the seat 100 is both unoccupied and occupied and the occupant is undergoing typical forces during flight the energy absorbing extension 204 does not bend.

The typical forces for commercial passenger aircraft is generally no more than about 1.2 gravities (g's) and may reach 2 g's during certain maneuvers. Military pilots, in contrast, can be subjected to up to 9 g's during high-speed maneuvers and aircraft carrier take-off and landing. A "g" is a term for accelerations felt as weight. It is not a force, per se, but a force per unit mass. The typical units are 9.80665 newtons of force per kilogram of mass. However, to the occupant O, the force is perceived as a weight. The g-force acceleration acts as a multiplier of weight-like forces on the occupant O. Thus, 2 g's is felt by the occupant O as if she weighed twice as much as her normal weight. Given an average weight of an occupant, 1 g can translate to about 170 pounds of loading.

Figure 7:
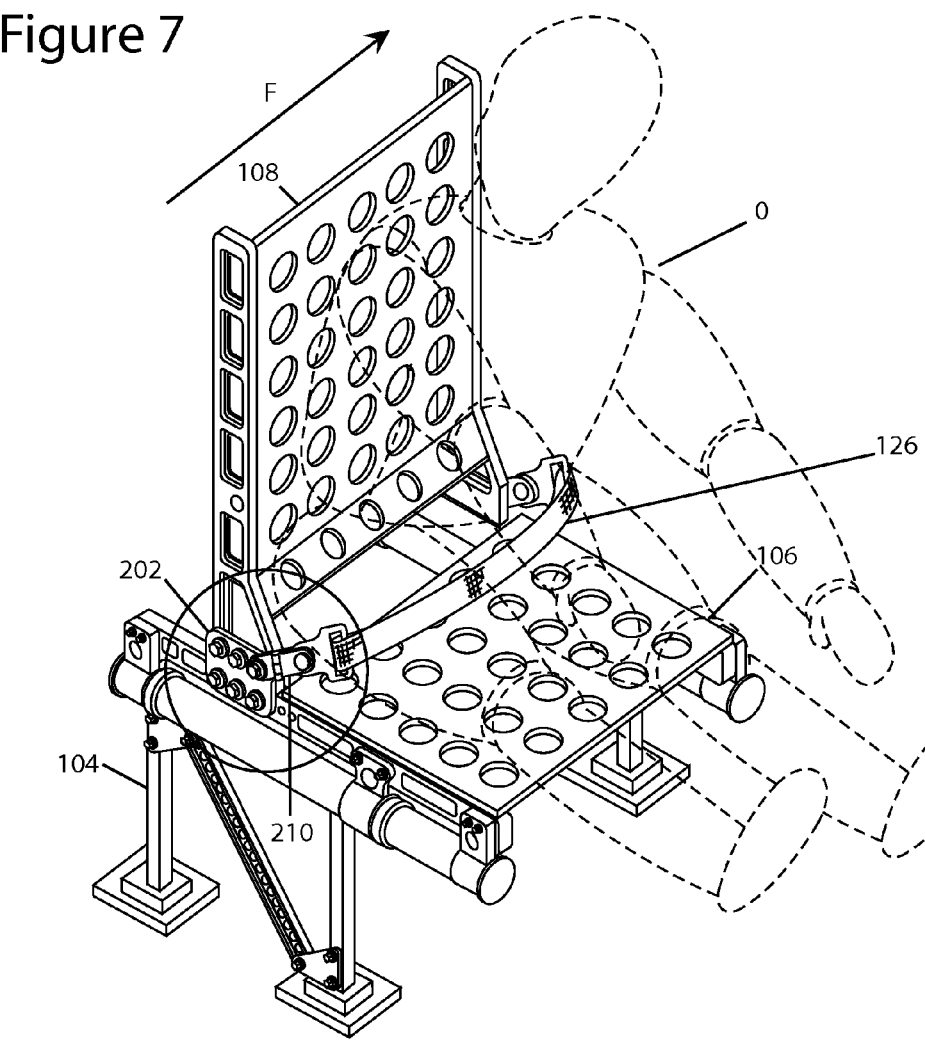
FIG. 7 is a front side profile view of the seat frame with an occupant during extreme loading.
Figure 8:
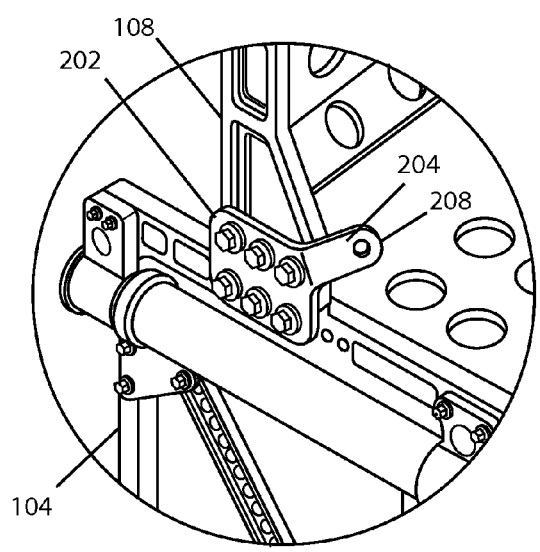
FIG. 8 is an insert view of FIG. 7 illustrating the energy absorbing device post extreme loading.

In one example, the energy absorbing extension 204 only undergoes forces when the forces on the seatbelt are generally perpendicular to a forward-facing occupant. As can be seen in FIG. 7, the occupant O is undergoing lateral forces F, translating the occupant sideways off the seat 100. When undergoing these forces F the seatbelt 126 and the seat 100 absorb the forces to keep the occupant in the seat and the seat 100 attached to the aircraft. Typically, to resist lateral forces, the seat 100 is stiffened, making it heaver. In this example, the energy absorbing extension 204 bends as the seatbelt 126 and the seat 100 undergo lateral forces F in reaction to those forces F. Thus, the seat can be lightened since the energy absorbing extension 204 is taking a portion of the forces F.

This is why, in the above example, the energy absorbing extension 204 and the support device 120 are in contact along almost their entire lengths Le, Ls. This distributes the forces F along the length of the energy absorbing extension 204 instead of concentrating it at a small point of contact where the seatbelt engaging element 128 contacts the energy absorbing extension 204.

In various examples, the energy absorbing extension 204 can act in certain ways. As noted above, under normal commercial airlines forces F, typically less than 2 g's, the energy absorbing extension 204 does not bend or, said another way, does not undergo either elastic or plastic deformation. As the forces F increase, in one example, the energy absorbing extension 204 does not undergo elastic deformation. Once a force F of about 10 g's or greater is applied, the energy absorbing extension 204 begins to undergo plastic deformation. The energy absorbing extension 204 continues to undergo plastic deformation, and does not fracture until an excess of 16 g's is applied. In context, a force F of about 10 g's is about 1,700 pounds felt by the occupant.

In another example, when the lateral forces F range between about 2 g's and about 10 g's, the energy absorbing extension 204 can undergo elastic deformation, thus returning to its original position after bending under the force F. As the lateral forces F increase, or are applied in a dynamic fashion (e.g. a sudden, high impulse force) above 10 g's the energy absorbing extension 204 can begin to undergo plastic deformation. Here, the energy absorbing extension 204 does not return to its normal shape or position and needs to be replaced once the aircraft has landed. In the above examples, if the energy absorbing extension 204 undergoes plastic deformation, the energy absorbing device 200 should be replaced before the aircraft flies again. In an example, the energy absorbing extension 204 can absorb a load of about 16 g's of force under plastic deformation without failure. These forces of about 10 g's to about 16 g's are typically generated from a very fast deceleration of the aircraft (e.g. a crash landing).

The FAA has standards for "16 g seats" since the FAA realizes that 16 g's simulates the loads that could be expected in an impact-survivable accident, (i.e., the occupant survives the crash of the aircraft). This test requires that the deceleration goes from a minimum of 44 ft/sec to 0 ft/sec in not more than 0.09 seconds with a peak deceleration of at least 16 g's. Since this test is for the entire seat 100, the other components of the seat must also be able to survive this loading. However, the seat can be lightened since the energy absorbing device 200 can absorb some of the forces before they are translated to the seat frame.

Typical aircraft seats can be approximately 50 pounds of aluminum, and properly stiffened to absorb the 16 g loading. The energy absorbing device 200 can absorb enough force to reduce approximately 40% of the weight of the aluminum in the aircraft seat. In an example, a 52 pound aluminum seat frame was reduced to 32 pounds with the inclusion of the energy absorbing device 200 and was still able to qualify under the FAA standards for 16 g seats. This was a weight reduction of about 38%.

As examples, various features have been mainly described above with respect to an airplane seat. In other implementations, features described herein may be implemented mainly in one or more other types of seats, including automobile seats.

It will also be apparent that various features described above may be implemented in many different forms in the implementations illustrated in the figures. The actual various features are not limiting.

In the preceding specification, various examples have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. An energy absorbing device for a seat containing an occupant, comprising:
    a seat frame having an upper surface and a lower surface;
    a plurality of leg members attached to the lower surface of the seat frame;
    a seat pan attached to the upper surface of the seat frame;
    a back member attached to the upper surface of the seat frame and approximately perpendicular to the seat pan;
    an energy absorbing device fixed approximate to where the back member attaches to the seat frame, comprising:
        an engagement portion fixing the energy absorbing device to at least one of the seat frame and the back member; and
        an energy absorbing extension having a fixed end integral with the engagement portion, and a protruding end extending toward the seat pan; and
    a belt support device comprising:
        a first end fixed to the engagement portion; and
        a second end, approximately opposite the first end, engaging a seatbelt to support the occupant, and extends parallel to the energy absorbing extension;
    wherein when the occupant is using the seatbelt and the seat undergoes lateral forces, the energy absorbing extension undergoes deformation;
    wherein when the occupant is not using the seatbelt and the seat undergoes lateral forces, the energy absorbing extension does not undergo deformation; and
    wherein the energy absorbing extension is unsupported by any of the seat frame, seat pan, or back member between the fixed end and the protruding end.

2. The energy absorbing device of claim 1, wherein the seat is an aircraft seat.

3. The energy absorbing device of claim 1, wherein the energy absorbing extension is at an angle of about 30°-60° from the engagement portion.

4. The energy absorbing device of claim 3, wherein the energy absorbing extension is at an angle of about 45° from the engagement portion.

5. The energy absorbing device of claim 1, wherein the energy absorbing extension undergoes deformation at about 10 gravities.

6. The energy absorbing device of claim 5, wherein the energy absorbing extension undergoes plastic deformation.

7. The energy absorbing device of claim 1, wherein the energy absorbing extension undergoes deformation at about 16 gravities.

8. The energy absorbing device of claim 7, wherein the energy absorbing extension undergoes plastic deformation.

9. The energy absorbing device of claim 1, wherein the energy absorbing extension undergoes deformation from about 2 gravities to about 10 gravities.

10. The energy absorbing device of claim 9, wherein the energy absorbing extension undergoes elastic deformation.

11. The energy absorbing device of claim 1, wherein the energy absorbing extension undergoes plastic deformation greater than about 10 gravities.

12. The energy absorbing device of claim 1, wherein the seat can withstand the loading of the occupant undergoing a deceleration of a minimum of 44 feet per second to 0 feet per second in less than or equal to 0.09 seconds with a peak deceleration of at least 16 gravities.

* * * * *